United States Patent
Bergerhoff et al.

(10) Patent No.: US 10,361,755 B2
(45) Date of Patent: Jul. 23, 2019

(54) SMARTPHONE WITH INTEGRATED MULTI-TRANSPONDER MODE KEY DEVICE

(71) Applicant: Continental Intelligent Transportation Systems, LLC, Santa Clara, CA (US)

(72) Inventors: Nikolas Bergerhoff, North Vancouver (CA); Tejas Desai, Troy, MI (US); Tammer Zein-El-Abedein, Campbell, CA (US)

(73) Assignee: Continental Intelligent Transportation Systems, LLC, Santa Clara, CA (US)

( * ) Notice: Subject to any disclaimer, the term of this patent is extended or adjusted under 35 U.S.C. 154(b) by 0 days.

(21) Appl. No.: 15/606,159

(22) Filed: May 26, 2017

(65) Prior Publication Data
US 2017/0345240 A1 Nov. 30, 2017

Related U.S. Application Data

(60) Provisional application No. 62/342,162, filed on May 26, 2016.

(51) Int. Cl.
*H04W 76/10* (2018.01)
*B60R 25/24* (2013.01)
(Continued)

(52) U.S. Cl.
CPC ........... *H04B 5/0068* (2013.01); *B60R 25/24* (2013.01); *G07C 9/00571* (2013.01); *H04B 5/0081* (2013.01); *H04L 67/10* (2013.01); *H04L 67/125* (2013.01); *H04M 1/72533* (2013.01); *H04W 4/50* (2018.02); *H04W 76/10* (2018.02); *H04W 88/06* (2013.01); *B60R 2325/205* (2013.01);
(Continued)

(58) Field of Classification Search
None
See application file for complete search history.

(56) References Cited

U.S. PATENT DOCUMENTS

2008/0246586 A1   10/2008  Hiramine
2009/0001930 A1*   1/2009  Pohjonen ............. H01Q 1/2225
                                                             343/866

(Continued)

FOREIGN PATENT DOCUMENTS

DE    102014101086 A1    7/2015
WO    2016/054253 A1     4/2016
WO    2016/054276 A1     4/2016

OTHER PUBLICATIONS

Search Report dated Apr. 10, 2017, from corresponding GB Patent Application No. GB1610546.2.
(Continued)

*Primary Examiner* — Craig A. Renner

(57) ABSTRACT

A smartphone having: a configurable radio frequency transmitter; a configurable low frequency transponder with at least one low frequency coil; and a smartphone application program that is controlled by a cloud service and that is configured to configure the radio frequency transmitter and the low frequency transponder with protocol parameters and initial data values such that the low frequency transponder mimics a virgin key device that can be programmed to a particular vehicle model.

14 Claims, 4 Drawing Sheets

(51) Int. Cl.
  *G07C 9/00* (2006.01)
  *H04B 5/00* (2006.01)
  *H04L 29/08* (2006.01)
  *H04W 88/06* (2009.01)
  *H04W 4/50* (2018.01)
  *H04M 1/725* (2006.01)
  *H04W 4/40* (2018.01)

(52) U.S. Cl.
  CPC ............ *G07C 9/00857* (2013.01); *G07C 2009/00404* (2013.01); *G07C 2009/00412* (2013.01); *G07C 2009/00492* (2013.01); *G07C 2009/00507* (2013.01); *G07C 2009/00865* (2013.01); *H04M 1/7253* (2013.01); *H04M 2250/04* (2013.01); *H04W 4/40* (2018.02)

(56) References Cited

U.S. PATENT DOCUMENTS

| | | |
|---|---|---|
| 2011/0102164 A1 | 5/2011 | Ghabra |
| 2012/0252365 A1 | 10/2012 | Lam |
| 2015/0363988 A1 | 12/2015 | Van Wiemeersch et al. |
| 2016/0098870 A1* | 4/2016 | Bergerhoff ......... G07C 9/00007 340/5.61 |
| 2016/0308675 A1* | 10/2016 | Tschache et al. ... G07C 9/00896 |

OTHER PUBLICATIONS

International Search Report and Written Opinion dated Jul. 31, 2017 from corresponding International Patent Application No. PCT/US2017/033545.

\* cited by examiner

SMARTPHONE WITH INTEGRATED MULTI-TRANSPONDER MODE KEY DEVICE

BACKGROUND

Out of the roughly 1 billion light vehicles currently on the road, new key devices for vehicle access and start may be programmed by a consumer without any dealer involvement for up to about 30-50% of those vehicles. Vehicles built until 2006-2010 typically allow the owner to add additional keys, which the owner can "learn" to their vehicle. An owner would have to have a valid key that came with the car, and, perhaps go through a predefined sequence, such as turning on and off the ignition multiple times within a predefined period of time (e.g., 4 times within 30 seconds) or unlocking and locking the power door locks a predetermined number of times within a predetermined period of time. The vehicle will then typically give an indication that it is in a mode to learn additional keys. For example, the vehicle may provide an audible indication, such as a chime. A new unprogrammed key (also referred to as a virgin key) may then be recognized by the vehicle through a process in which the virgin key transmits a radio frequency ("RF") telegram, and the vehicle accepts the credentials from the key and stores those credentials in an electronic control unit, such as the vehicle's body controller. On newer models, a similar procedure may also be performed over a low frequency ("LF") immobilizer interface by putting the new key into the ignition or near a pushbutton used for starting the vehicle or some other predefined location within the vehicle. In this way, the secrets and the rolling-code counter, which are required to synchronize a new key with the vehicle may be provided to, and stored in, the new key.

Generally, there are three types of access control systems for vehicles. First, a mechanical blade to both unlock the door and start the engine. Second, came Remote Keyless Entry (RKE), which allows users to press a key on a fob to unlock the door. An anti-theft option also was introduced with RKE. Anti-theft is typically implemented with a coil around the ignition switch. The coil is connected to an immobilizer, which prevents unauthorized starting of the vehicle's engine. The coil communicates an LF signal to a transponder in the head of the key, which changes or validates a secret code, which allows the engine to start. Third, passive systems work without actively operating the authorization device. The key can remain in the vehicle operator's pocket, for example. When a door handle or a button on the door handle is touched, the vehicle sends a signal to the fob, which responds with a proper signal, and then the vehicle unlocks, which is essentially hands-free operation with respect to the fob. Similarly, once inside the vehicle, upon pressing a start button, for example, antennas within the vehicle send a signal to the fob, which responds via RF thereby allowing the vehicle's engine to be started. This replaces the need, in the RKE systems with anti-theft, to place the place the fob or a key close to the immobilizer coil in order to start the engine. Passive mode only works when the fob battery is charged. If the fob battery is flat (i.e., discharged), a mechanical key would have to be used to unlock the car. That is so-called limp-home mode for unlocking a car that has passive entry. Limp-home mode for starting the engine for a car with passive start is the same as the RKE system with anti-theft, which means that the fob will be placed near the immobilizer coil, which will provide energy to the microcontroller in the fob to respond with a secret code so that the vehicle can be started even when the fob battery is discharged.

Vehicle access (i.e., unlocking a vehicle's door) involves a unidirectional communication. A button is pressed on a remote-control key fob, which causes the fob to send out a telegram to the vehicle. The vehicle and the key share a common secret. The algorithm that generates an appropriate code is called a rolling code. The algorithm is known to both the key and the car. A command, such as lock or unlock, is transmitted along with the next valid rolling code. The most recently used rolling code gets stored. Then an algorithm is used to generate the next rolling code based on the most recently used rolling code. The vehicle then accepts only future rolling codes, relative to the most recently used rolling code, which prevents a so-called replay attack.

For start authorization, the communication scheme that is implemented on every car is a so-called challenge-response scheme. The car and the legitimate key, once it is programmed, share one secret, which is a bit pattern that is identical and which is referred to as a secret key. Both have the same secret key. The vehicle generates a random number, which is called a challenge, and sends the random number to the key. The vehicle then takes the random number that it just generated and runs it through a cryptology algorithm, e.g., HITAG 2, which uses the secret key to produce a result. The key does the same thing. The key also runs the random number received from the vehicle through the cryptology algorithm, which uses the secret key to produce a result, which is called a response. The key then sends this response back to the car, which checks whether the response matches the expected value calculated by the vehicle. If the response is correct, then the vehicle allows the key to start the vehicle.

Vehicle implementations for RKE, PASE (Passive Start and Entry), and Immobilizer are highly fragmented between different vehicle models in their respective RF protocols, LF protocols, learning procedures, and the like. Conventional vehicle keys, therefore, will typically work with only one particular vehicle model. Such keys have a single communications protocol, for example, adapted for use with a single vehicle model.

As such, a smartphone having embedded electronics that can be configured to act as a legitimate access and start authorization device for many different vehicle models would be an improvement over the prior art.

DETAILED DESCRIPTION

Figure 1:
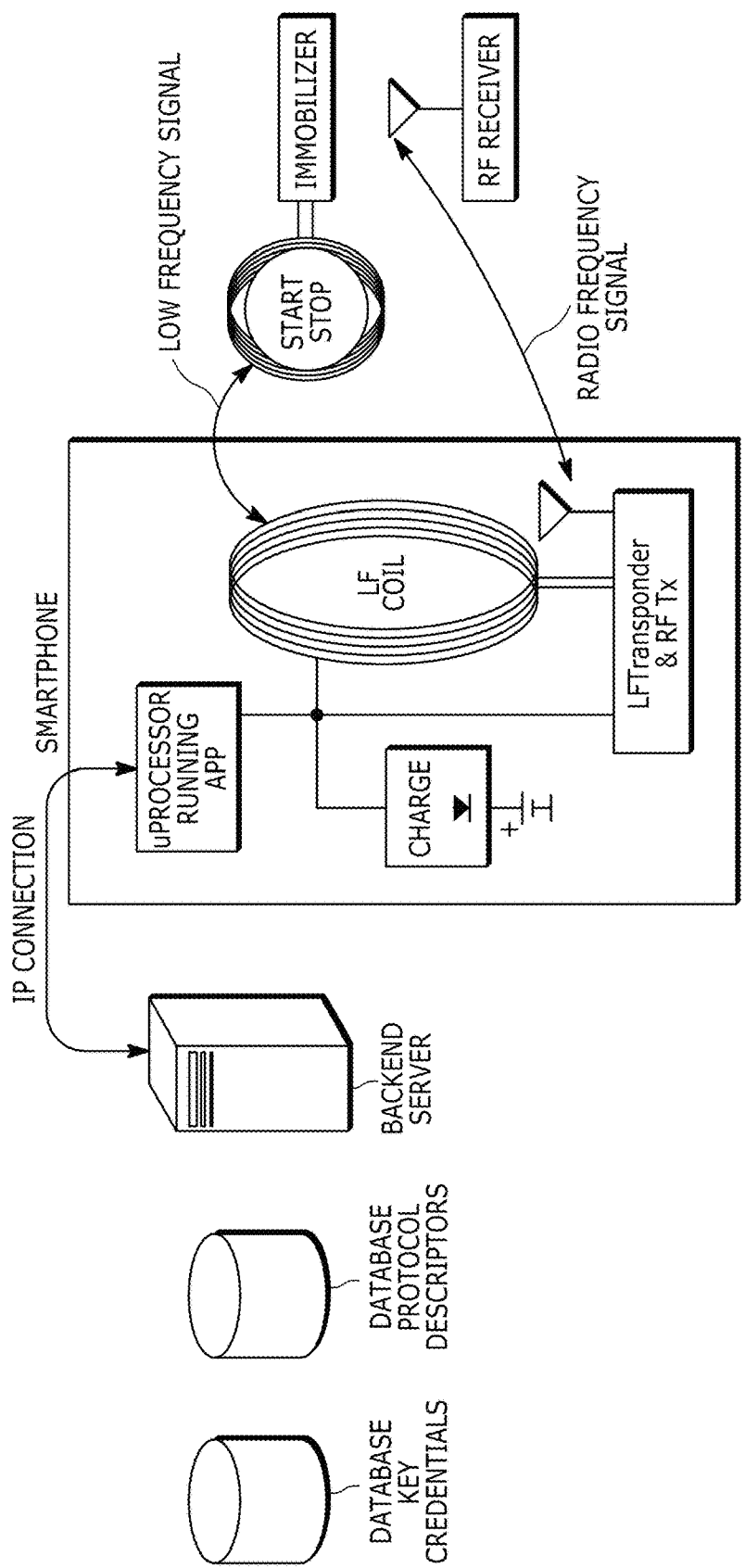
FIG. 1 depicts a smartphone with an integrated multi-transponder mode key device in accordance with embodiments of the invention.
Figure 2:
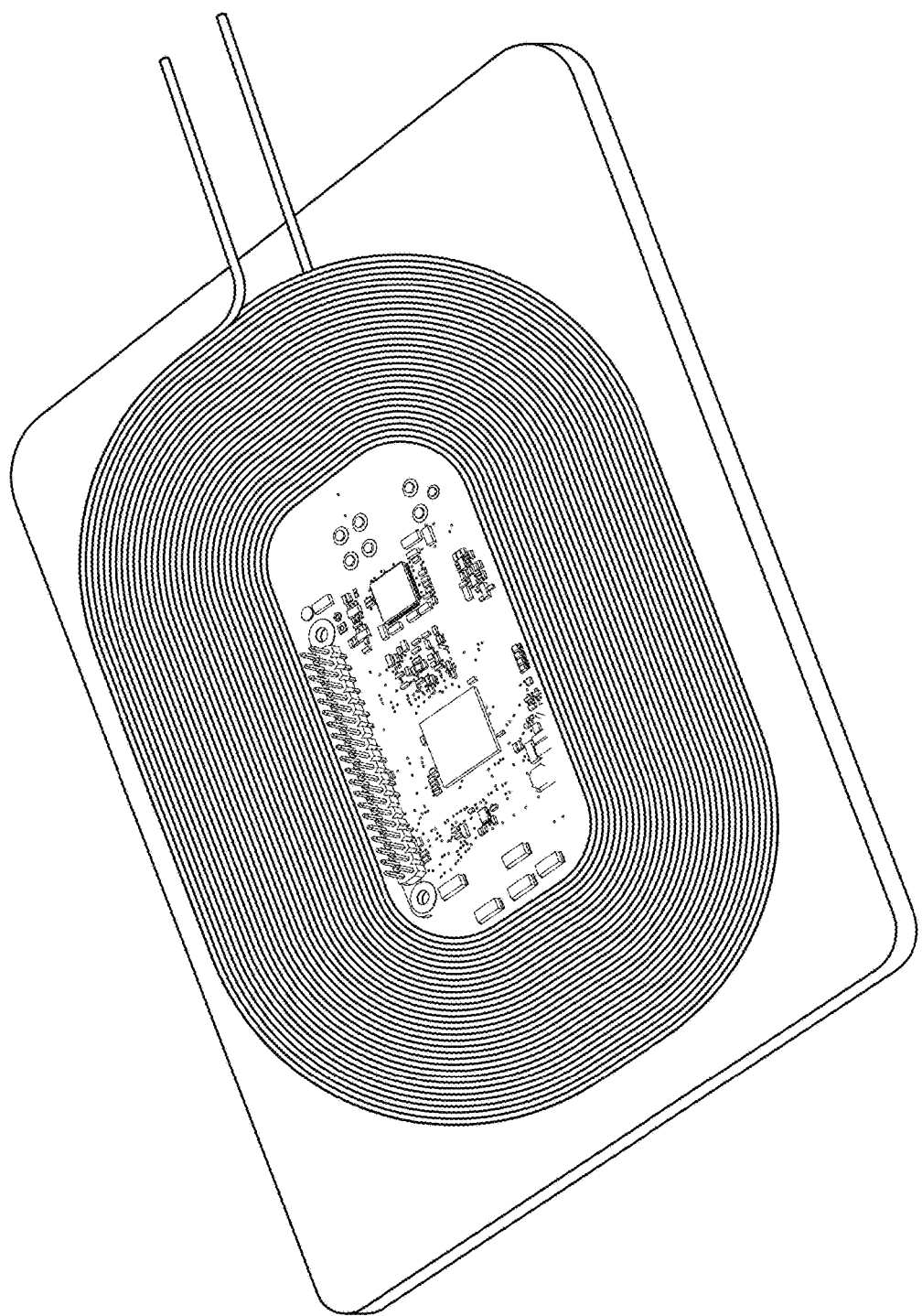
FIG. 2 depicts printed copper traces on a plastic film in accordance with embodiments of the invention.
Figure 3:
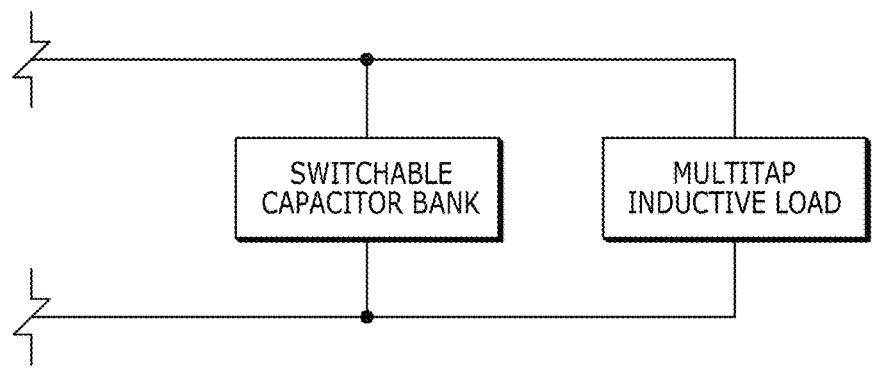
FIG. 3 depicts a plurality of resonant frequency tuning elements, in the form of a switchable capacitor bank in parallel with a multitap inductive load, switchably coupled to the low frequency coil depending on whether the low frequency coil is being used for transponder communication or wireless power charging.
Figure 4:
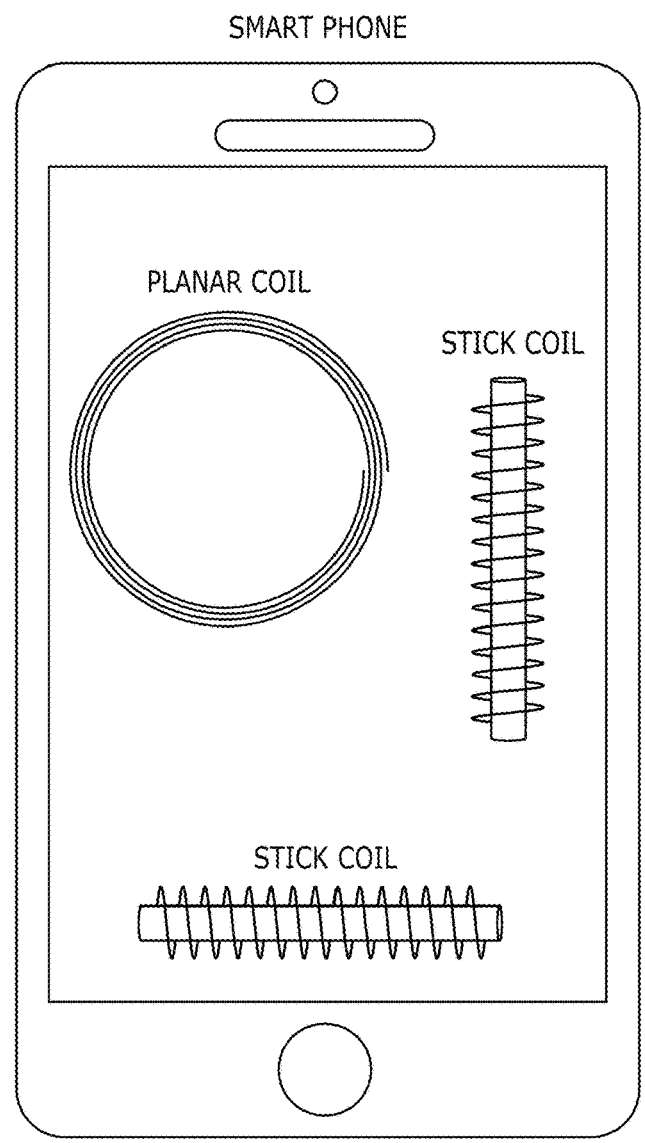
FIG. 4 depicts a smartphone having a planar low frequency coil and first and second additional low frequency coils.
Figure 5:
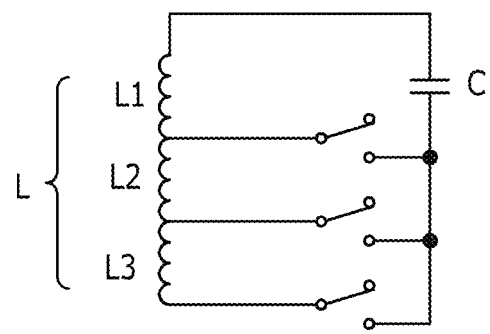
FIG. 5 depicts a plurality of resonant frequency tuning elements, in the form of a capacitor bank in parallel with a multitap inductive load, switchably coupled to the low frequency coil depending on whether the low frequency coil is being used for transponder communication or wireless power charging.
Figure 6:
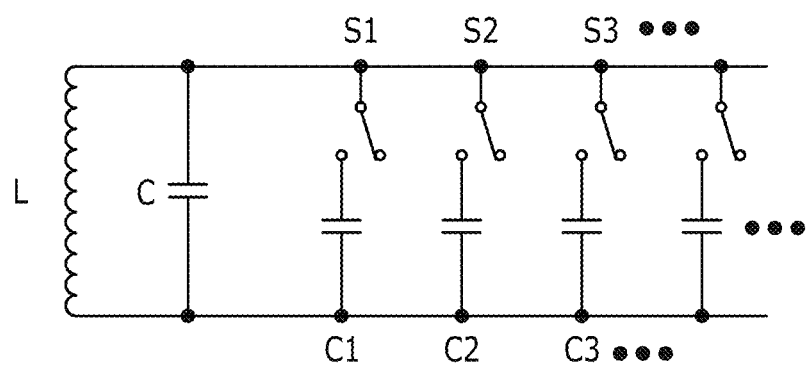
FIG. 6 depicts a plurality of resonant frequency tuning elements, in the form of a switchable capacitor bank in parallel with an inductive load, switchably coupled to the low frequency coil depending on whether the low frequency coil is being used for transponder communication or wireless power charging.

FIG. 1 depicts integration of a highly configurable RF transmitter, a highly configurable LF transponder, and at least one LF coil within a smartphone in accordance with embodiments of the invention. The highly configurable RF transmitter may include, but is not limited to, a fractional-N-PLL for tunable center frequency, selectable modulation, baseband encoding, and the like. The highly configurable LF transponder may include, but is not limited to, selectable protocols, selectable cryptology, on the fly memory configuration, and the like. According to embodiments, the highly configurable RF transmitter and the highly configurable LF transmitter may be embodied in a single chip package having approximate dimensions of 5×5×0.8 mm. Typical RF center frequencies may be 315 MHz, 434 MHz, 868 MHz and 902 MHz. Typical LF center frequencies may be 125 kHz and 134 kHz. The transponder may be capable of performing challenge-response communication schemes with the vehicle's immobilizer after being configured accordingly.

The single chip package may include a microcontroller core, a co-processor for quickly executing a cryptology algorithm, such as AES, for example. The single chip package may have an analog front end configured to receive analog signals picked up by LF coils, amplify those signals, convert them to digital form via a digital-to-analog converter, and then demodulate the signal. In other words, the single chip package may include a fully-fledged receiver topology. The single chip package may also include an analogous LF transmission topology. On the RF side, there is a transmitter with a tunable center frequency that may be realized by a fractional N-PLL. The single chip package may be a mixed signal chip with a microcontroller at the core. A microcontroller typically has a CPU and a memory and some I/O ports. LF receiver and LF transmitter. The single chip package may include a transponder having the capability to be powered by a received wave. A transceiver, on the other hand, will work only if it is actively powered by an energy source.

In some embodiments, the components discussed above with respect to the single chip package may be embodied on foil such that the whole assembly is approximately the size of a typical business card.

A PCB trace on the smartphone, or the already existing multiband antenna structure for cellular and Bluetooth/Wifi in a smartphone, may be used as an RF antenna.

At least one LF coil may be integrated into the smartphone. The at least one LF coil may couple with the vehicle's immobilizer coil to receive energy and to receive and transmit data.

In accordance with embodiments of the invention, basically any existing key fob used for access and/or start authorization may be emulated. The LF transponder & RF transmitter may be switched between various carrier frequencies. When an unlock button is pressed on a display of the smartphone, a vehicle-specific RF telegram is generated.

The RF telegram is an encrypted message that includes an unlock command. Before the RF transmitter sends the telegram, though, the RF transmitter is configured in accordance with configuration parameters received from a backend server. Transfer of the configuration parameters from the backend server to the smartphone may be initiated during a key learning operation by the smartphone transferring information about the vehicle (e.g., a vehicle identification number) for which the smartphone will act as a key for access and start authorization. Software running on the single chip package may store the configuration parameters received from the backend server. The single chip package may have, for example, internal memory, EEPROM, RAM, Flash memory, which may be used for storing, for example, a vehicle-specific secret key, which is also stored in the car, and other related data. Settings that specify at which frequency an oscillator should generate a carrier signal are also stored by the single chip package.

To configure the smartphone as a key, it should be put into the so-called virgin mode. That includes transmitting on the right frequency, with the right modulation, and the right bit rate, but also configuring it with an initial secret. That initial secret gets digested by the car, and then the car decides on the final secret for the key and sends the final secret to the key. This is how they get paired. From then on, the challenge-response mechanism and the rolling codes can be used.

In accordance with embodiments, protocol parameters and initial data values are set in the RF transmitter and LF transponder to mimic a vehicle model specific virgin key device that can be programmed to a specific vehicle model. The transponder may be programmed to an individual vehicle by exchanging data between the transponder and the vehicle's immobilizer and storing this data, e.g., a secret key, in the transponder and in a corresponding vehicle ECU. After having programmed the transponder, conveying individual vehicle data such, as the secret key exchanged during the programming, to the backend server to enable sharing of access rights and the generation of vehicle specific RKE telegrams. Such access rights may be time or usage bound by adding corresponding time and date information or a counter which may be encoded by the cloud when downloading configuration data or telegrams and evaluating those in the smart phone app or on the microcontroller of the transmitter/transponder chip or in the vehicle.

To minimize the amount of memory and processing power used on the smartphone for car-key functionality, the backend server may generate RF telegrams and send the telegrams to the device together with the vehicle-specific configuration parameters.

Space within a smartphone is a very limited resource. As such, the size of single chip package or foil should be minimized. Another way in which space may be used efficiently within the smartphone is a dual-use coil that is used for both charging the smartphone battery and for wirelessly communicating with a vehicle's immobilizer coil for vehicle start authorization.

An LF coil, as it currently exists in a smart phone for charging, might have to be modified for use in embodiments of the invention because the inductance might require a different range for charging versus the transponder communication. As such, a multi-tap coil having, for example three connections, may be used. Then, the two outer connections would produce more inductance, which would be well suited to transponder communication. And if one of the outer pins and the inner connection are used, there will be a lower inductance, which is more well suited to charging because, for charging, relatively low voltage and high current are desirable. Whereas, for transponder communication, low current and high voltage are desirable.

A switchable capacitor bank or switchable multi-tap inductive load may be used to switch between the dual uses of the coil. Switching of this type could be achieve just with capacitors, or with multi-tap inductive load, or with both the capacitors and the multi-tap inductive load. It is an oscillating circuit, with a resonance frequency defined by a particular capacitance value and a particular inductance value, connected in parallel, as is well known in the art. Vehicle immobilizer transponders typically operate at either 125 kHz or 134 kHz, and, for wireless charging of smartphone batteries, 200 kHz is a typical frequency.

Some embodiments include a single coil within the smartphone. Other embodiments may include a second and optionally a third coil. These additional coils may be oriented within the smartphone such that the field lines from these additional coils are perpendicular to each other and perpendicular to the first coil. A first coil be a planar coil, like a circle on a piece of paper, with field lines oriented perpendicularly into and out from the paper, which would be a useful orientation for holding the back of the smartphone against the start button in a vehicle. To orient a thin edge of the phone (e.g., the bottom edge of the phone), a small stick coil, including a ferrite with copper coil windings, which have approximate dimensions of 2×10×3 mm, may be used. One such stick coil on the x axis and one such stick coil on the y axis may also be used because the field lines for such a stick coil run along the longitudinal axis of the stick. With all three coils, signals may be captured from any of the three directions, x, y, and z. A smartphone with three coils oriented such that the respective field lines of the coils are perpendicular to each other is well suited to operating in the passive start mode, which is intended to operate regardless of the position and orientation of the smartphone within the vehicle. When used in this mode, the LF transceiver receives a challenge and the response may be transmitted via RF (not LF as in the transponder mode).

On-board noise, which is generated by the electronics in the smartphone, is a potential problem with using a smartphone for passive start authorization. Limp-home start, in a PASE system, requires that the key be held against a coil that is inside the car and that is connected to the immobilizer. It's not as convenient, but it still works to start the car. This solves the on-board-noise problem because when in the passive mode, the signal sensitivity is very low, e.g., microvolts, for the induced voltage received at the coil in the smartphone. Whereas in the immobilizer mode, voltages are much larger, such as 3-5 volts, for example. The on-board noise is less of a concern due to the high voltages, which results in signal-to-noise ratios that will be good enough for communicating.

A use case that is enabled by embodiments of the invention is using smartphones as keys for car sharing. The convenience provided by passive or hands-free mode is generally not required for car sharing. Instead, pushing a button on a smartphone for access to a shared car and holding the phone next to a predetermined location in the vehicle and pushing a button on the smartphone are acceptable requirements for gaining access to and starting a shared car.

Generation of valid telegrams may be performed by the backend server or by software downloaded onto the smartphone depending on whether it is desirable to keep the backend server in control of the process of generating telegrams or whether off-line operation of the smartphone as a vehicle key is desired.

In an embodiment, at least one LF coil is a planar coil which may be printed on a plastic carrier such as polyamide film and thus has a very thin form factor (thickness<0.1 mm).

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

The invention claimed is:

1. A smartphone comprising:
a configurable radio frequency transmitter;
a configurable low frequency transponder with at least one low frequency coil;
a smartphone application program that is controlled by a cloud service and that is configured to configure the radio frequency transmitter and the low frequency transponder with protocol parameters and initial data values such that the low frequency transponder mimics a virgin key device that can be programmed to a particular vehicle model;
wherein the at least one low frequency coil is configured to operate between 125 kHz and 134 kHz for transponder communication with an immobilizer of a vehicle, and the at least one low frequency coil is configured for wireless power charging of a battery of the smartphone;
a first additional low frequency coil and a second additional low frequency coil;
wherein field lines of the at least one low frequency coil are perpendicular to field lines of the first additional low frequency coil which are perpendicular to field lines of the second additional low frequency coil such that the smartphone is configured to perform challenge-response communications with the vehicle's immobilizer in passive-start mode regardless of the orientation of the smartphone within the vehicle; and
wherein, when used in passive-start mode, the smartphone receives a challenge from the vehicle's immobilizer via LF in a 125 kHz to 134 kHz range, and the smartphone transmits a response to the vehicle via RF in a 315 MHz to 902 MHz range.

2. The smartphone of claim 1, further comprising a plurality of resonant frequency tuning elements switchably coupled to the low frequency coil depending on whether the low frequency coil is being used for transponder communication or wireless power charging.

3. The smartphone of claim 2, wherein the at least one low frequency coil is a planar coil.

4. The smartphone of claim 3, wherein the planar coil further comprises printed copper traces on a plastic film.

5. The smartphone of claim 1, wherein the low frequency transponder is configured to exchange data with the vehicle immobilizer and store the exchanged data in the transponder.

6. The smartphone of claim 5, wherein the exchanged data comprises a secret key.

7. The smartphone of claim 6, wherein the secret key was received from the vehicle immobilizer.

8. The smartphone of claim 7, wherein the smartphone application program is configured to convey the secret key to the cloud service.

9. The smartphone of claim 8, wherein the smartphone application program is configured to receive remote keyless entry telegrams from the cloud service.

10. The smartphone of claim 9, wherein the remote keyless entry telegrams are specific to the vehicle.

11. The smartphone of claim 10, wherein the remote keyless entry telegrams are configured to enable sharing of access rights to the vehicle.

12. The smartphone of claim 11, wherein the access rights are time bound.

13. The smartphone of claim 11, wherein the access rights are usage bound.

14. The smartphone of claim 1, wherein the configurable radio frequency transmitter and the configurable low frequency transponder are both included in a single-chip package.

* * * * *